US007385484B2

(12) United States Patent (10) Patent No.: US 7,385,484 B2
Nath et al. (45) Date of Patent: Jun. 10, 2008

(54) METHOD FOR AUTOMOBILE REGISTRY CONTROL SYSTEM

(76) Inventors: Sanjeev Nath, 530 E. 76th St., New York, NY (US) 10021; Rajesh Patel, 77 Highland St., Rocky Hill, CT (US) 06067

( * ) Notice: Subject to any disclaimer, the term of this patent is extended or adjusted under 35 U.S.C. 154(b) by 187 days.

(21) Appl. No.: 10/740,197

(22) Filed: Dec. 18, 2003

(65) Prior Publication Data

US 2005/0134480 A1 Jun. 23, 2005

Related U.S. Application Data

(63) Continuation-in-part of application No. 10/704,456, filed on Nov. 7, 2003, now Pat. No. 7,230,545.

(51) Int. Cl.
*B60R 25/10* (2006.01)

(52) U.S. Cl. ............................ 340/426.1; 340/426.16; 340/438

(58) Field of Classification Search ................ 340/438, 340/539.1, 539.11, 539.13, 539.16, 933, 10.33, 340/426.16, 425.5, 937, 426.1; 701/1, 2, 701/29

See application file for complete search history.

(56) References Cited

U.S. PATENT DOCUMENTS

| | | | | |
|---|---|---|---|---|
| 3,034,287 | A | 5/1962 | Odom et al. | |
| 3,955,560 | A | 5/1976 | Stein et al. | |
| 4,031,991 | A | 6/1977 | Malott | |
| 4,137,520 | A | 1/1979 | Deveau | |
| 4,183,203 | A | 1/1980 | Maezawa et al. | |
| 4,742,573 | A | 5/1988 | Popovic | |
| 4,837,568 | A | 6/1989 | Snaper | |
| 5,204,670 | A | 4/1993 | Stinton | |
| D355,903 | S | 2/1995 | Pollack et al. | |
| 5,635,693 | A * | 6/1997 | Benson et al. | 340/10.33 |
| 6,052,065 | A | 4/2000 | Glover | |
| 6,356,855 | B1 | 3/2002 | Yamagata et al. | |
| 6,408,232 | B1 * | 6/2002 | Cannon et al. | 701/29 |
| 6,525,674 | B1 | 2/2003 | Kelly et al. | |
| 6,526,335 | B1 * | 2/2003 | Treyz et al. | 701/1 |
| 6,542,077 | B2 * | 4/2003 | Joao | 340/426.16 |
| 6,636,752 | B1 | 10/2003 | Madarasz et al. | |
| 6,687,497 | B1 | 2/2004 | Parvulescu et al. | |
| 6,690,295 | B1 | 2/2004 | DeBoer | |
| 6,690,296 | B2 | 2/2004 | Corwin et al. | |
| 6,690,956 | B2 | 2/2004 | Chua et al. | |
| 2002/0070852 | A1 | 6/2002 | Trauner et al. | |

FOREIGN PATENT DOCUMENTS

| | | | |
|---|---|---|---|
| EP | 1035746 | A1 | 9/2000 |

OTHER PUBLICATIONS

Infrared Data Association, "Point and Shoot Profile," Version 1.1 Mar. 20, 2000 from www.irda.org, pp. 1-34.

Polgreen, Lydia, New York Times, "To Get the Phone, Dirvers are Willing to Risk Getting a Ticket," Sep. 2, 2003.

* cited by examiner

*Primary Examiner*—Van T. Trieu
(74) *Attorney, Agent, or Firm*—Kelley Dyre & Warren LLP

(57) ABSTRACT

The invention described is a method and system for communicating automated vehicle information via a transceiver-facilitated communication device.

17 Claims, 5 Drawing Sheets

A.R.C.S. OVERALL SYSTEM

VISUAL DIAGRAM OF ARCS MOUNTED
INSIDE THE VEHICLE

DISPLAY CONTROLLER

METHOD FOR AUTOMOBILE REGISTRY CONTROL SYSTEM

RELATED APPLICATIONS

This application is a continuation-in-part application of patent application Ser. No. 10/704,456 filed Nov. 7, 2003, now U.S. Pat. No. 7,230,545, from which priority is asserted, and the disclosure of which is herein incorporated by reference in its entirety.

BACKGROUND

1. Field of Invention

The present invention described and claimed herein relates to methods and systems to display, store and communicate vehicle information using wireless communication.

2. Discussion of Prior Art

A vehicle identification number (VIN) reading and transmitting devices, such as disclosed in U.S. Pat. No. 6,052,065, and further in U.S. Pat. Nos. 4,837,568; 4,742,573; 5,204,670; 3,955,560; 4,137,520; and U.S. Design No. 355,903, (which disclosures are incorporated herein in their entirety) are known in the art.

One embodiment of the novel Automobile Registry Control System (ARCS) of the present invention makes use of devices known in the art. While these devices fulfill their respective particular objectives and requirements, the prior art does not suggest the instant Automobile Registry Control System.

SUMMARY OF PRESENT INVENTION

In the automobile industry, a number of methods have been devised for providing easy access to vehicle information. These methods suffer from a number of disadvantages including the ease with which fraud can be perpetrated. e.g., by presenting the vehicle identification number to the vehicle manufacturer a duplicate key can be made.

BRIEF DESCRIPTION OF THE DRAWINGS

These embodiments are deemed non-limiting exemplary embodiments, in which identical reference numerals identify similar representative structures throughout the several diagrams, and wherein, according to the present invention.

DETAILED DESCRIPTION

The invention described in detail below refers to the figures illustrating the systematic arrangement for maintaining communication by means of components comprising of a main controller, display controller and communication controller.

In one embodiment of the present invention, ARCS provides a method for displaying the vehicle registration information and other pertinent information regarding the vehicle (e.g. ownership, insurance, registration, licensing and maintenance information) and provides a mechanism for storing and updating the Vehicle Registration Information and other mandatory information pertaining to the same vehicle (e.g. ownership, insurance, registration, licensing and maintenance).

Figure 1:
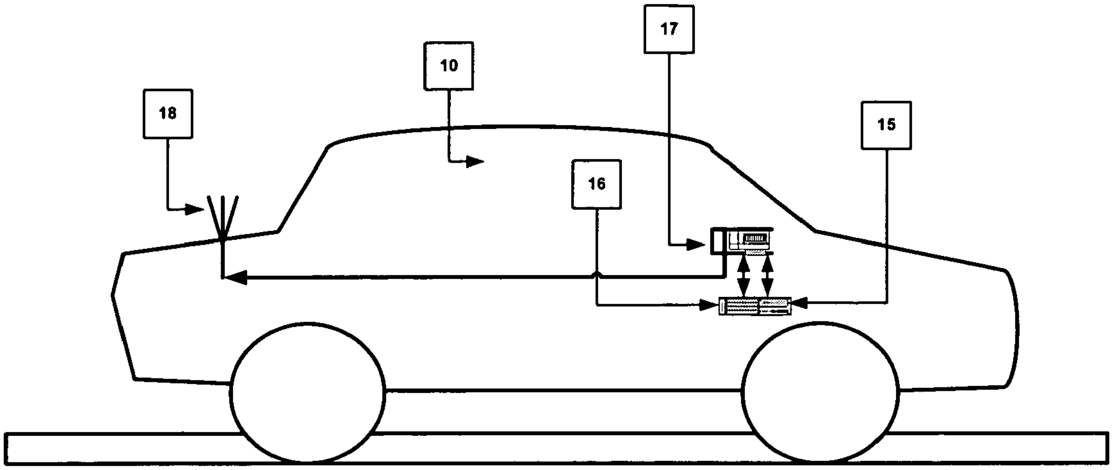
FIG. 1 depicts an exemplary diagram of an ARCS embodiment mounted in a vehicle.

FIG. 1 depicts one embodiment of the present invention. Shown is a system diagram of an ARCS mounted in a vehicle. The system is designed so as to significantly reduce human intervention thus saving time and other costs.

Referring to FIG. 1, a vehicle 10 equipped with the communication controller 16 and can be enhanced further by mounting an external Antenna 18. The main controller unit 15 is harnessed with display controller 17 and communication controller 16. The communication can be facilitated between two individual equipment entities using, for example, WLan, Bluetooth or similar systems.

Figure 2:
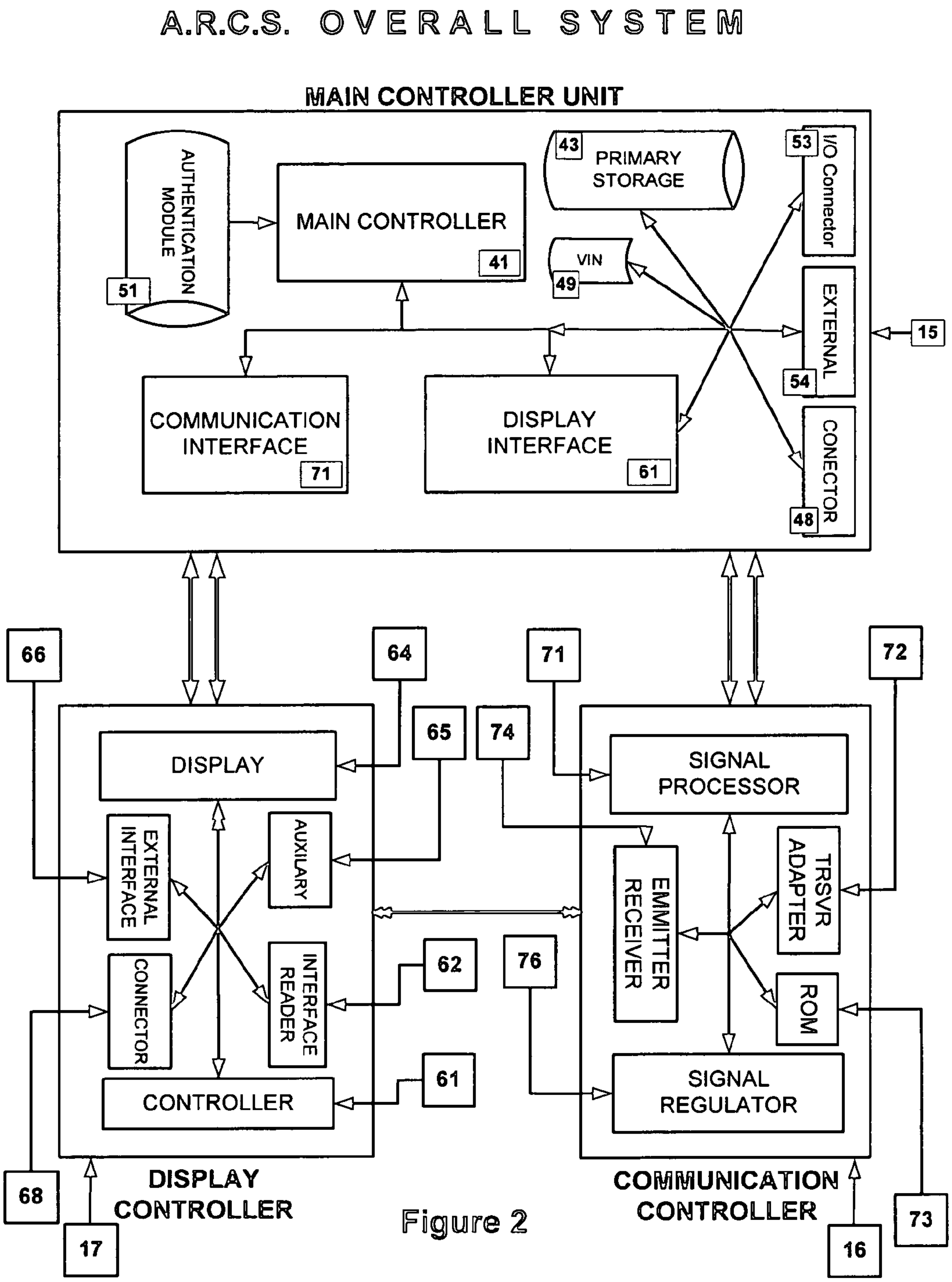
FIG. 2 depicts an exemplary functional block diagram of an ARCS overall system.

FIG. 2 depicts an exemplary architecture of an ARCS module. Vehicle 10 is mounted with the ARCS which comprises three main components. (a) main controller unit 15; (b) communication controller 16; and (d) display panel with IO interface 17.

Main controller unit 15 is mounted with an authentication module 51, a communication interface 71, a display interface 61 and external interface 54 which are shared by same system bus. The system is also provided with the VIN number 49 which is stored on, for example, a separate chipset, an extra physical storage 43, a set of connectors 48 and an I/O Connector 53. The display controller 17 consists of controller 61, an interface reader 62, an auxiliary interface 65, a display panel 64, sets of external interface 66 for external connectivity 68.

The communication controller 16 comes mounted with signal processor 71, a signal regulator 76, a transceiver adapter 72, and ROM 73, according to at least one embodiment of the present invention.

All the above mentioned components can be installed as one fully functional device or can be installed as individual working units depending on the end user specifications and requirements.

Figure 3:
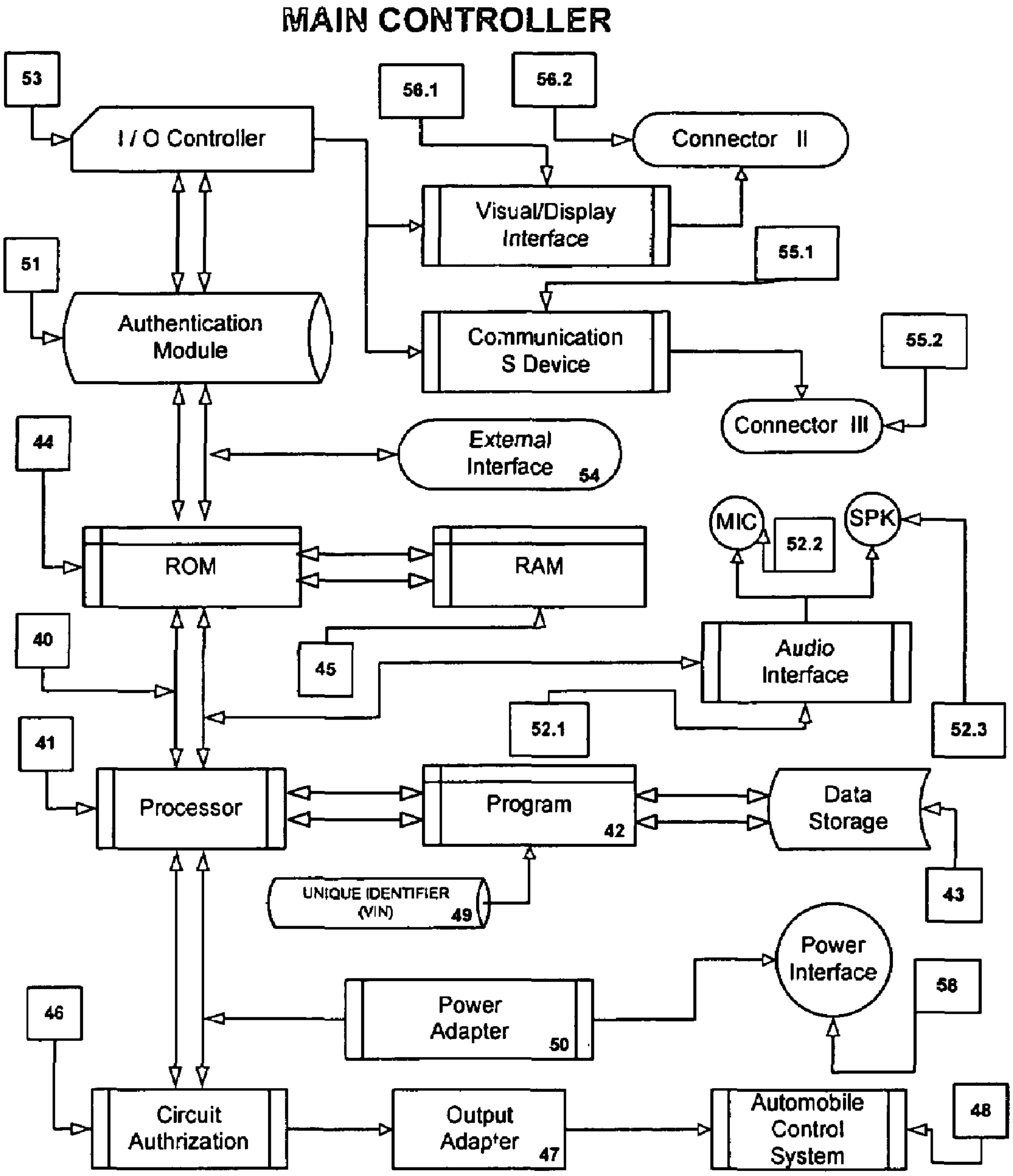
FIG. 3 depicts an exemplary functional block diagram of a main controller device employable in an ARCS system.

Referring to overall system diagram of FIG. 3, the main controller unit 15 uses a single processor 41 which is connected by a system bus 40 with other peripheral devices. An operating system 42 running on the processor 41 provides control and may be used to coordinate the functions of the various components of the automobile registry control system (ARCS). The operating system 42 is stored in Read Only Memory (ROM) 44 which is contained in the ARCS and has sufficient amount of memory RAM 45. Various application programs for different automobile monitoring and control functions may be stored in ROM 44. Such stored application programs may be moved in and out of RAM 45 to be executed and to perform their respective functions. The ARCS main controller unit 15 contains the hard-coded Vehicle Identification number 49 pre-programmed by the manufacturer. All existing vehicles can be programmed by matching the mandatory information provided to the official motor vehicle authorities by the automobile manufacturers. A special two level authentication processes is provided to avoid or prevent any type of vandalism and theft. The main controller unit 15 is married to the automobile computer system 48 with a special circuit authorization module 46 connected to it via output adapter 47. Any separation, break or intrusion of the main controller or any of its installed components will disable the vehicle by shutting down all the operational units. The main controller unit 15 records the entire event and simultaneously starts the vandalism reporting transmission to the immediate receivers. In case of an error, the owner has full control to override the transmission by providing a two level security authentication code. The main controller unit 15 is powered by vehicle main power supply 50. It also has its own independent power supply 58 in case the main power supply fails or is intentionally disabled.

The main controller unit 15 in FIG. 3 is also mounted with an authentication module 51 containing a self-generated unique identification number which enables the main controller unit 15 to interact with the display controller 17 as well as the communication controller 16. Visual interface 56.1, a communication device 55.1, an audio interface 52.1 are also provided to communicate under defined circumstances via I/O controller 53. The auxiliary external interface 54 is also provided in case of emergency connectivity. The audio interface 52.1 is provided with connectivity with the vehicle speaker system 52.3. The connectivity to the microphone 52.2 is optional. The connectivity to main controller unit 15 is accomplished via connector 55.2 and 56.2.

Figure 4:
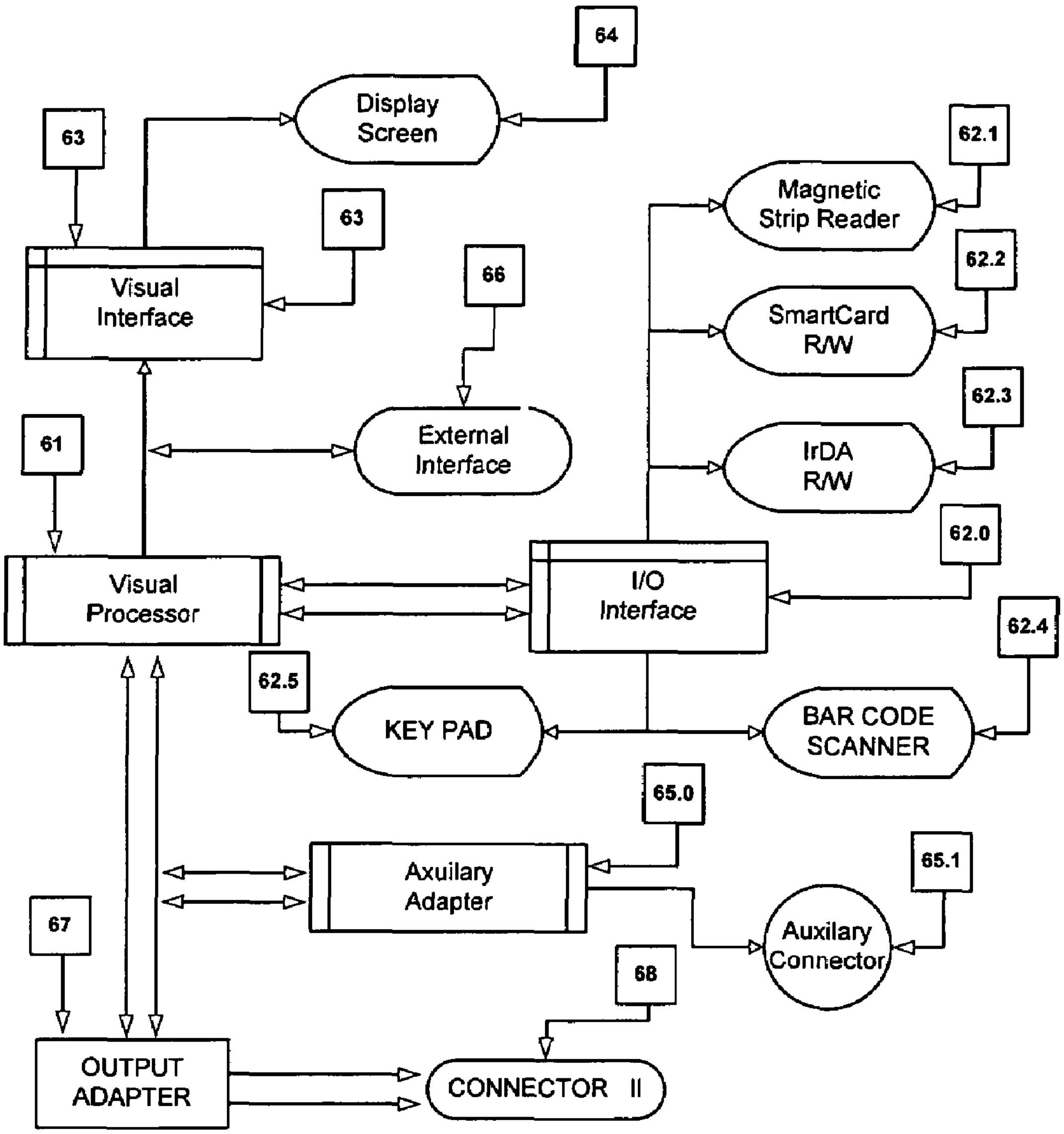
FIG. 4 depicts an exemplary display controller component employable in an ARCS system.

FIG. 4 depicts an exemplary functional block diagram of an automobile registry display controller (ARDC) 17 which is defined in detail further down. The display controller is hard wired through connector 68 via output adapter 67. The connector 68 is connected to main controller through connector 56.2. The Display controller provides 5 different types of I/O Interface 62: (a) Magnetic Strip reader 62.1; (b) Smartcard Reader 62.2; (c) IrDA Reader and Writer 62.3; (d) Barcode Scanner 62.4, and (e) Miniature Key Pad 62.5.

The display controller is equipped with multi-lines, graphic compatible LCD display panel 64, which is controlled via visual interface module 63. The external interface module 66 is provided to communicate with ACRS in case of an emergency. The auxiliary connector 65.1 is provided for any future modifications or module integration. The visual processor 61 maintains the best visibility under extreme circumstances. All the future add-ons are connected via auxiliary adapter 65.

Figure 5:
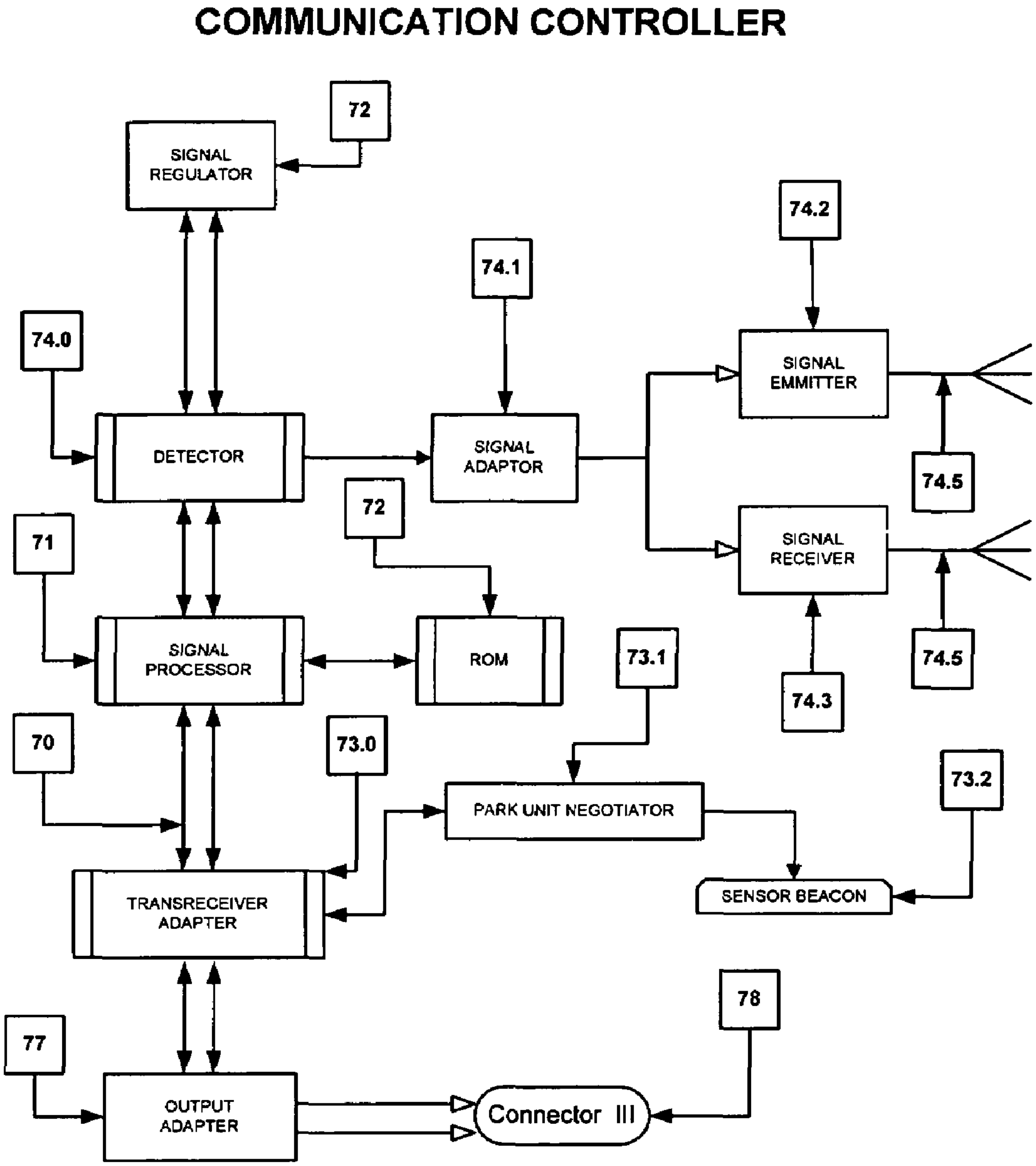
FIG. 5 depicts an exemplary communication controller component employable in an ARCS system.

FIG. 5, a communication controller 16 is defined in detail. The communication controller 16 comes integrated with a signal processor 71 and an independent ROM 72 (other than main controller ROM). Communication controller 16 is integrated to the main controller 41 via an authentication module 51 located inside the main controller unit 15. The transceiver adapter 73.0 is mounted inside the communication controller, which is connected to a sensor beacon 73.2 via park unit negotiator 73.1. The main functionality of Park Unit Negotiator 73.1 is to commence a handshake with an intelligent wireless communication device (IWCD), small computers for radiowave reception and sending of communication by radiowave, as soon as the vehicle comes into or is parked in a metered or restricted access zone. The transceiver adapter 73 calculates the grace time of “n” minutes which is granted for the handshake between the IWCD and the communication device. On successful completion of the handshake, the detector 74 initiates the communication signal with the IWCD. The corresponding signals are emitted via signal emitter 74.2 and received by signal receiving module 74.3. The antennas 74.5 and 74.6 are pre-attached for enhanced signal resolution using signal adapter 74.1 in different weather conditions. The power supply is maintained through connector III 78 via output adapter 77. The signal regulator 72 mounted inside the communication controller regulates the spectrum of the signal transmitted.

The signal used for transmission can be accomplished via Bluetooth technology, Conventional radio frequency or Wireless communication using IEEE 802.11x & 802.16x standards. The Bluetooth’s native ad-hoc network property makes it very useful by replacing bulky cables, providing printing support or acting as ID cards. The Bluetooth wireless specification includes both link layer and application layer definitions for product developers which support data, voice, and content-centric applications. Handheld wireless communication devices that comply with the Bluetooth wireless specification operate in the unlicensed, 2.4 GHz radio spectrum ensuring communication compatibility worldwide. These radio devices use a spread spectrum, frequency hopping, full-duplex signal at up to 1600 hops/sec. The signal hops among 79 frequencies at 1 MHz intervals to give a high degree of interference immunity. Up to seven simultaneous connections can be established and maintained. (Further details can be viewed at www.bluetooth.org or www.bluetooth.com.)

Radiofrequency (RF) is another name for radio waves. It is one form of electromagnetic energy that makes up the electromagnetic spectrum. Electromagnetic energy consists of waves of electric and magnetic energy moving together (radiating) through space. The area where these waves are found is called an electromagnetic field.

Radio waves are created due to the movement of electrical charges in antennas. As they are created, these waves radiate away from the antenna. All electromagnetic waves travel at the speed of light. The major differences between the different types of waves are the distances covered by one cycle of the wave and the number of waves that pass a certain point during a set time period. The wavelength is the distance covered by one cycle of a wave. The frequency is the number of waves passing a given point in one second. For any electromagnetic wave, the wavelength multiplied by the frequency equals the speed of light. The frequency of an Rf signal is usually expressed in units called hertz (Hz). (One Hz equals one wave per second. One kilohertz (kHz) equals one thousand waves per second, one megahertz (MHz) equals one million waves per second, and one gigahertz (GHz) equals one billion waves per second).

Rf energy includes waves with frequencies ranging from about 3000 waves per second (3 kHz) to 300 billion waves per second (300 GHz). Microwaves are a subset of radio waves that have frequencies ranging from around 300 million waves per second (300 MHz) to three billion waves per second (3 GHz).

Basically WLAN is an ordinary LAN protocol which is a modulated carrier of radio frequency waves. WLAN IEEE 801.11 is a natural extension to LAN Ethernet, and the modulated protocol is IEEE 802.3 (Ethernet 3).

Common WLAN Products, which are using IEEE standards, are based on IEEE 802.11 and 802.11b specification. 802.11b is a high rate extension to the original 802.11, and specific 5.5 to 11 Mbps data rate. The next HyperLAN2 generation using IEEE 802.11a, IEEE 802.11 g standards, operates in a new band frequency of 5 GHz, and achieves a high data rate as 54 Mbps. The new networking technology WiMax IEEE 802.16x should provide higher speed, and more coverage than existing Wi-Fi standards.

We claim:

1. A method for wirelessly registering and monitoring a motor vehicle without human intervention, the automatic method comprising the steps of:

(i) communicating and registering without human intervention vehicle information particular to the vehicle by wireless means from a vehicle registry control system comprising an intelligent wireless transceiver located in a vehicle to a communication device located remote from the vehicle;

(ii) authenticating the information from the remote communication device to the vehicle registry control system;

(iii) communicating between the wireless vehicle registry control system and a vehicle main computer system; and (iv) recording and reporting automatically and wirelessly a disruption or intrusion of the automatic vehicle registry control system in connection with the vehicle main computer leading to vehicle shutdown, to and from said remote communication device, and further to external monitoring and authenticating transceivers and/or computer systems; which vehicle shutdown can be overridden or reversed by an operator of said vehicle.

2. The method of claim 1, wherein the vehicle information comprises a vehicle identification number (VIN#) or code.

3. The method of claim 1, wherein the vehicle information comprises vehicle registration information.

4. The method of claim 1, wherein the vehicle information comprises vehicle insurance information.

5. The method of claim 1, wherein the vehicle information comprises vehicle maintenance information.

6. The method of claim 1, wherein the vehicle information comprises vehicle operator and/or ownership information.

7. The method of claim 1, wherein the vehicle information comprises special access/parking permits.

8. The method according to claim 1, wherein the vehicle is selected from a group consisting of: an automobile, a truck, a bus, train, tractor, crane, a 2-or 3-wheel conveyance, or a motorcycle.

9. The method according to claim 8, wherein said wireless means comprises:

WLAN 802.1 lx and 802.16x standards;
Radio Frequency;
Bluetooth; or
Infra-Red.

10. The method according to claim 1, wherein the wireless intelligent transceiver unit of one vehicle has the capability of communicating to the wireless intelligent transceiver unit of another vehicle under both defined and undefined emergency situations.

11. The method according to claim 10, wherein the defined and undefined emergency situation is comprised of:

an accident;
an access violation
a theft; or
another emergency.

12. The method according to claim 1, comprised of the ability to update vehicle-associated information.

13. The method according to claim 1, wherein the vehicle information comprises: vehicle identification number; vehicle registration; vehicle insurance; vehicle ownership information; vehicle operator information; vehicle special/access/parking permits; vehicle operator license endorsements and restriction information; vehicle operators motor vehicle rules infraction history; vehicle maintenance information; and/or vehicle accident history information.

14. The method of claim 1 further comprising the step of displaying the vehicle information within the vehicle registry control system mounted in the vehicle.

15. The method of claim 1, further comprising the step of automatically storing the vehicle information within the vehicle registry control system mounted in the vehicle.

16. The method according to claim 1, further comprising the step of automatically recording the state of vehicle operations in conjunction with a vehicle main computer system.

17. A system for automatically monitoring and reporting a vehicle activity or location to remote private and/or official transceivers from an intelligent wireless communication device, wherein the transceivers in turn communicate with external computer networks, comprising:

an automatic vehicle registry control and monitor system in communication with a vehicle main computer system and an external transceiver or computer system;

wherein a disruption or intrusion of the automatic vehicle registry control and monitor system in communication with a vehicle main computer system causes a vehicle shutdown and a wireless communication to a remote law enforcement transceiver or computer system or network; which vehicle shutdown can be averted through a control override or reversal by an operator of said vehicle.

* * * * *